(12) United States Patent
Czachor

(10) Patent No.: US 7,373,779 B2
(45) Date of Patent: May 20, 2008

(54) METHODS AND APPARATUS FOR COOLING GAS TURBINE ENGINES

(75) Inventor: Robert Czachor, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 574 days.

(21) Appl. No.: 10/968,230

(22) Filed: Oct. 19, 2004

(65) Prior Publication Data

US 2006/0080950 A1  Apr. 20, 2006

(51) Int. Cl.
*F02C 7/12* (2006.01)
*F02C 7/18* (2006.01)

(52) U.S. Cl. .................... 60/772; 60/797; 60/39.83
(58) Field of Classification Search ............ 60/796, 60/797, 39.83, 772; 290/1 B
See application file for complete search history.

(56) References Cited

U.S. PATENT DOCUMENTS

| | | | | |
|---|---|---|---|---|
| 1,778,036 | A | * 10/1930 | Noble et al. | .............. 290/1 B |
| 1,933,949 | A | * 11/1933 | Weber | .............. 123/41.49 |
| 2,853,854 | A | * 9/1958 | Avery et al. | .............. 60/39.83 |
| 4,303,035 | A | * 12/1981 | Burns | .............. 114/187 |
| 5,461,865 | A | * 10/1995 | Snyder et al. | .............. 60/737 |
| 6,134,878 | A | * 10/2000 | Amako et al. | .............. 60/39.83 |
| 6,357,221 | B1 | * 3/2002 | Schroeder et al. | .............. 60/797 |
| 6,358,109 | B1 | 3/2002 | Neisen | |
| 6,412,284 | B1 | 7/2002 | Horner | |
| 6,537,490 | B2 | 3/2003 | Han | |
| 6,742,339 | B2 | 6/2004 | Horner | |
| 6,983,607 | B2 | * 1/2006 | Grove et al. | .............. 60/797 |

* cited by examiner

*Primary Examiner*—Ted Kim
(74) *Attorney, Agent, or Firm*—William Scott Andes, Esq.; Armstrong Teasdale LLP

(57) ABSTRACT

A method for assembling a gas turbine engine assembly that includes mounting a gas turbine engine including an inlet and an exhaust within a module that includes an inlet area, an exhaust area, and an engine area extending therebetween, such that the gas turbine engine is housed within the module, coupling a first deflector within the module engine area such that when cooling air is channeled past the deflector, the deflector induces a substantially helically-shaped cooling air flowpath around a periphery of the gas turbine engine, and coupling an exhaust duct to an outlet of the module exhaust area.

20 Claims, 3 Drawing Sheets

METHODS AND APPARATUS FOR COOLING GAS TURBINE ENGINES

BACKGROUND OF THE INVENTION

This invention relates generally to gas turbine engines, and more specifically to methods and apparatus for cooling gas turbine engines.

Gas turbine engines are used as a power source within a variety of applications. To protect the engine from the environment, and to shield a surrounding structure from the gas turbine engine, the gas turbine engine may be mounted within an enclosure that includes an inlet area, an exhaust area, and an engine area that extends between the inlet area and the exhaust area. The enclosure provides a physical structure to contain any engine fires that may ignite, and may include an apparatus to facilitate extinguishing fires within the enclosure. For example, the apparatus may release agents into the enclosure to distinguish the flames, or alternatively, the enclosure may include an apparatus to restrict air from entering the enclosure, thus preventing airflow from fueling the fire.

Because engines generally require continuous airflow for operation, within at least some known modules, the module inlet area includes a duct to route ambient air from outside the module to the engine, and the module exhaust area includes a duct to channel exhaust gases produced during operation of the engine from the module. During operation, heat is constantly generated by the gas turbine engine and various auxiliary equipment. Accordingly, cooling air is also channeled to the interior of the enclosure to facilitate cooling the gas turbine engine and other auxiliary equipment to within reasonable operating parameters. More specifically, at least one known gas turbine engine enclosure includes a fan configured to channel air from a forward end of the enclosure, through the enclosure, and outward through an exhaust duct coupled to an aft end of the enclosure.

However, channeling cooling air axially through the enclosure may generate a non-symmetric cooling airflow with respect to the gas turbine engine. The non-symmetric cooling airflow may cause an upper half of the gas turbine engine casing to receive a greater quantity of cooling air than a lower half of the gas turbine engine casing. Accordingly, non-symmetric thermal gradients may result within the gas turbine engine casing and cause a non-symmetric mechanical distortion of the casing, and eventually blade tips and/or seals may rub against an interior surface of the casing. Specifically, as the blade tip clearance increases, the gas turbine engine performance is reduced and an exhaust an gas temperatures (EGT) margin is reduced.

BRIEF SUMMARY OF THE INVENTION

In one aspect, a method of assembling a gas turbine engine is provided. The method includes coupling a first deflector within the module engine area such that when cooling air is channeled past the deflector, the deflector induces a substantially helically-shaped cooling air flowpath around a periphery of the gas turbine engine, and coupling an exhaust duct to an outlet of the module exhaust area.

In another aspect, a cooling system for a gas turbine engine is provided. The cooling system includes a first deflector coupled within a module, and a first supply fan configured to channel cooling air through the first deflector such that a substantially helically-shaped cooling air flowpath is generated around the gas turbine engine.

In a further aspect, a gas turbine engine assembly is provided. The gas turbine engine assembly includes a cooling system that includes a first deflector coupled within a module, and a first supply fan configured to channel cooling air through the first deflector such that a substantially helically-shaped cooling air flowpath is generated around the gas turbine engine.

DETAILED DESCRIPTION OF THE INVENTION

Figure 1:
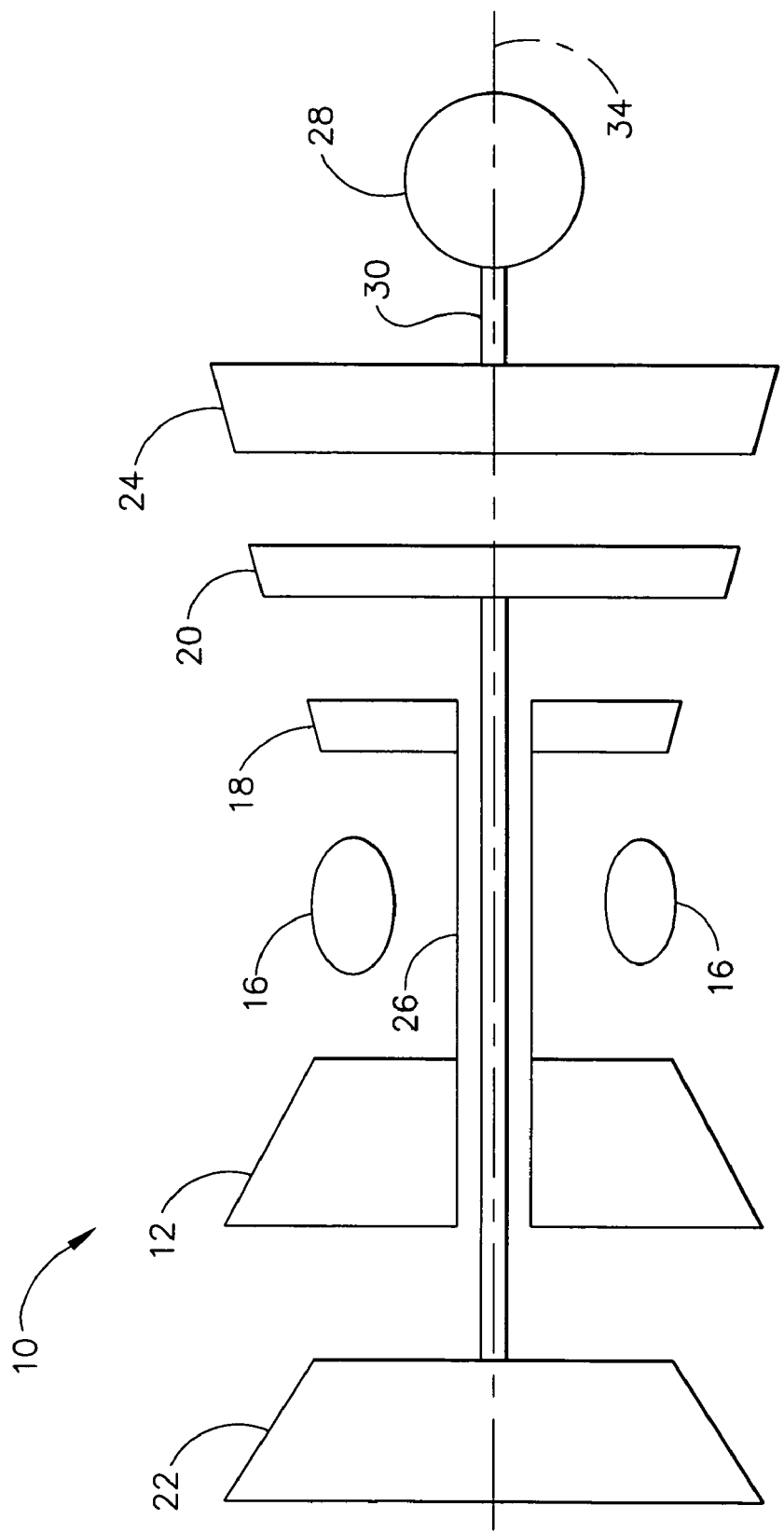
FIG. 1 is a schematic illustration of an exemplary gas turbine engine.

FIG. 1 is a schematic illustration of a gas turbine engine 10 including an engine inlet 22, at least one compressor 12, a combustor 16, a high pressure turbine 18, a low pressure turbine 20, and an exhaust nozzle 24 connected serially. In the exemplary embodiment, engine 10 is an LM2500 engine commercially available from General Electric Company, Cincinnati, Ohio. Compressor 12 and turbine 18 are coupled by a first shaft 26, and turbine 20 and a driven load 28 are coupled by a second shaft 30.

In operation, air flows into engine inlet 22, through compressor 12 in a direction that is substantially parallel to a central axis 34 extending through engine 10. The compressed air is then delivered to combustor 16 where it is mixed with fuel and ignited. Airflow from combustor 16 drives rotating turbines 18 and 20 and exits gas turbine engine 10 through exhaust nozzle 24.

Figure 2:
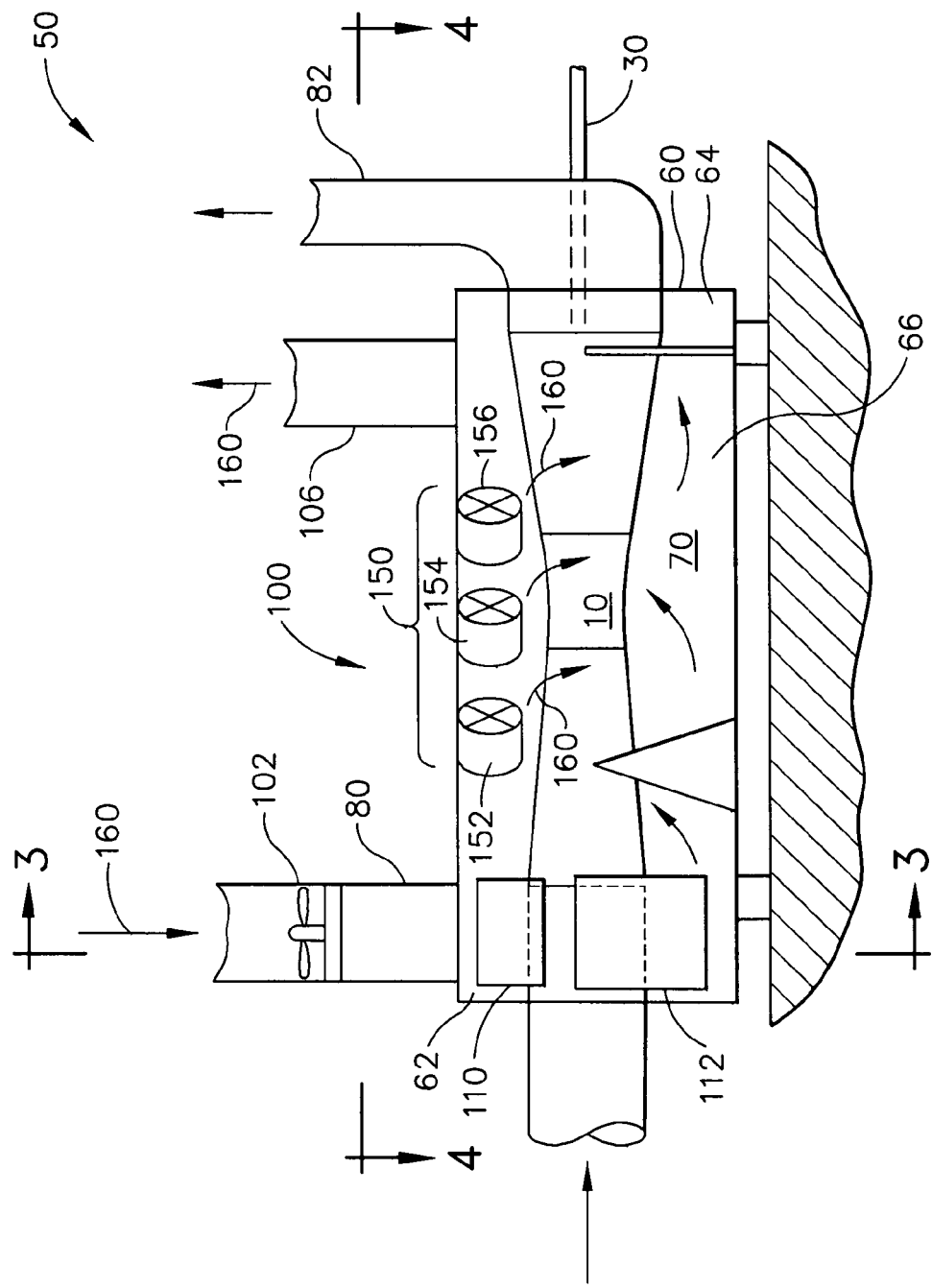
FIG. 2 is side view of an exemplary gas turbine module assembly that includes the gas turbine engine shown in FIG. 1.
Figure 3:
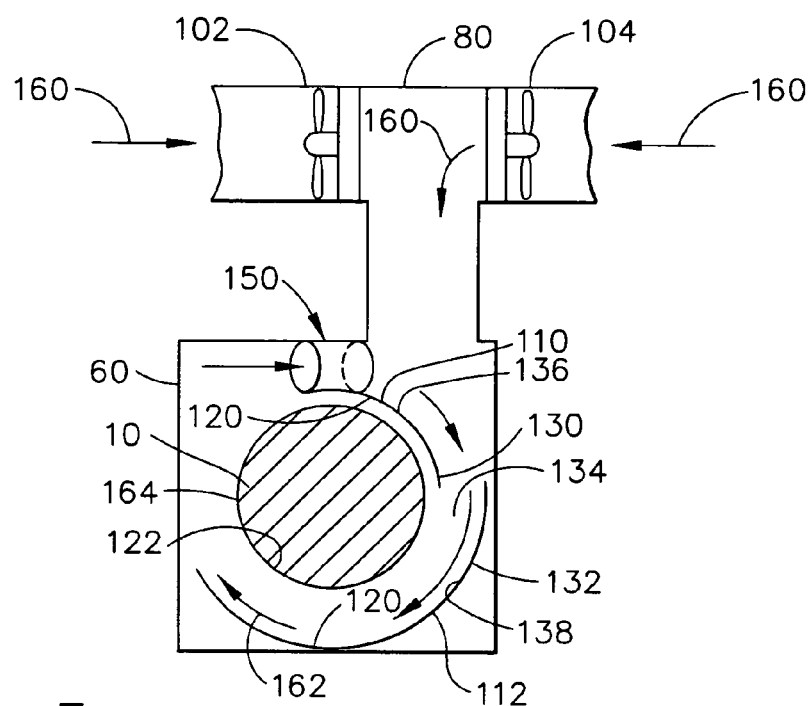
FIG. 3 is an end view of the gas turbine engine module assembly shown in FIG. 2 viewed along view 3-3.
Figure 4:
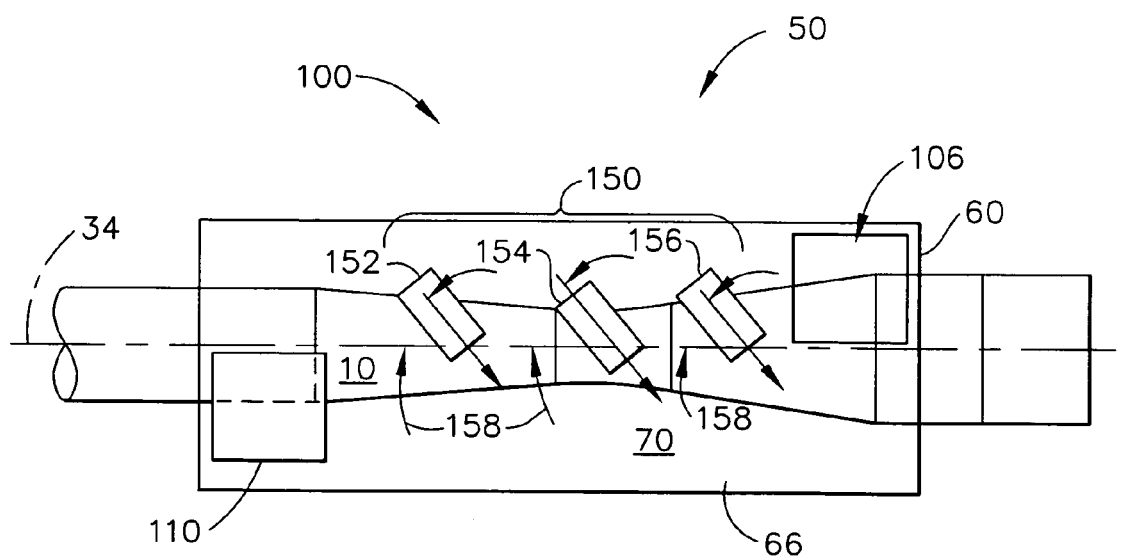
FIG. 4 is a top view of the gas turbine engine module assembly shown in FIG. 2 viewed along view 4-4.

FIG. 2 is side view of an exemplary gas turbine engine assembly 50. FIG. 3 is an end view of gas turbine engine assembly 50 shown in FIG. 2 viewed along view 3-3. FIG. 4 is a top view of gas turbine engine assembly 50 shown in FIG. 2 viewed along view 4-4.

Gas turbine engine assembly 50 includes a module 60 that may be used with a gas turbine engine similar to engine 10 (shown in FIG. 1). Module 60 includes an module inlet area 62, a module exhaust area 64, and a module engine area 66 that extends between module inlet and exhaust areas 62 and 64, respectively.

Module engine area 66 extends between module inlet area 62 and module exhaust area 64. Module engine area 66 defines a cavity 70 sized to receive engine 10 therein. Engine 10 is mounted within module engine area cavity 70 such that engine inlet 22 (shown in FIG. 1) is adjacent module inlet area 62, and engine exhaust nozzle 24 (shown in FIG. 1) is adjacent module exhaust area 64. In the exemplary embodiment, module inlet area 62 and module exhaust area 64 extend substantially perpendicularly from module engine area 66.

Gas turbine engine assembly 50 includes a module inlet duct 80 coupled in flow communication with module inlet area 62, and a module exhaust duct 82 coupled in flow communication with module exhaust area 64. Gas turbine engine assembly 50 also includes a module cooling system 100. In the exemplary embodiment, module cooling system 100 includes a first supply fan assembly 102 and a second supply fan assembly 104 that are both coupled within module inlet duct 80. In an alternative embodiment, gas turbine engine assembly 50 only includes either fan assembly 102 or fan assembly 104. In the exemplary embodiment, at least one of first and second supply fan assemblies 102 and 104 is energized to channel air through module inlet duct 80 and into module engine area 66.

Cooling system 100 also includes a cooling system exhaust duct 106 that is coupled in flow communication with module engine area 66. Specifically, in the exemplary embodiment, module inlet duct 80 is coupled to module engine area 66 for supplying cooling air to module engine area 66 for external cooling of engine 10. Spent cooling air is then discharged from module engine area 66 through cooling system exhaust duct 106 after cooling engine 10. More specifically, module engine area 66 is partitioned from module inlet area 62 such that airflow channeled through module inlet duct 80 is directed only through module engine area 66 for cooling engine 10.

In the exemplary embodiment, cooling system 100 also includes a first deflector 110 and a second deflector 112. First and second deflectors 110 and 112 are each coupled within module engine area 66 and each is formed with a radius of curvature 120 that is substantially similar to an external radius of curvature 122 of gas turbine engine 10.

In the exemplary embodiment, at least a portion 130 of first deflector 110 is positioned adjacent an end 132 of second deflector 112 such that a flow channel 134 is defined between first and second deflectors 110 and 112, respectively. More specifically, flow channel 134 is defined between a radially outer surface 136 of first deflector 110 and a radially inner surface 138 of second deflector 112.

In the exemplary embodiment, cooling system 100 also includes at least one booster fan assembly 150 coupled within module engine area 66. More specifically, in the exemplary embodiment, cooling system 100 includes a first booster fan assembly 152, a second booster fan assembly 154, and a third booster fan assembly 156. At least one of first booster fan assembly 152, second booster fan assembly 154, and/or third booster fan assembly 156 is oriented within module engine area 66 at a tangential angle 158 measured with respect to centerline axis of rotation 34, such that cooling air discharged from at least one of first booster fan assembly 152, second booster fan assembly 154, and/or third booster fan assembly 156 is discharged at an angle 158 that has a tangential component relative to engine axis of rotation 34.

Although, in the exemplary embodiment, cooling system 100 is illustrated as including three booster fan assemblies, 152, 154, and 156, it should be realized that cooling system 100 can have any quantity of booster fan assemblies. For example, cooling system 100 can include a single booster fan assembly 150, two booster fan assemblies 150, or more than three booster fan assemblies 150 without departing from the scope of the method and apparatus described herein.

During operation, air channeled through module inlet duct 80 to module engine area 66 facilitates cooling gas turbine engine 10. More specifically, at least one of supply fans 102 and/or 104 is energized to facilitate increasing a velocity of cooling air 160 channeled into module engine area 66. In the exemplary embodiment, at least a portion of the cooling air directed towards module engine area 66 is channeled through flow channel 134. The orientation of deflectors 110 and 112 to each other and within module engine area 66 facilitates generating a substantially helically-shaped cooling air flowpath 162 around a periphery 164 of gas turbine engine 10. More specifically, cooling air discharged from supply fan assemblies 102 and/or 104 is initially channeled into module engine area 66 in a substantially linear flowpath. As the flow enters flowpath 162, the orientation of deflectors 110 and 112 to each other and within module engine area 66 turns the direction of the flowpath and causes a substantially circular air flowpath to be generated. Accordingly, cooling air flowpath 162 includes an axial component and a helical component such that the cooling air 160 is channeled in a substantially helical, or swirling, fashion around gas turbine engine periphery 164. The helical flowpath facilitates enhancing cooling of the periphery 164 circumferentially about gas turbine engine 10.

Moreover, as the substantially helical flowpath 162 is generated about gas turbine engine 10, the velocity of such air 160 may be reduced. Accordingly, at least one of booster fans 152, 154, and/or 156 is energized to facilitate increasing the velocity of cooling air 160 within module engine area 66. More specifically, as an operating temperature within engine area 66 increases, at least one booster fan 152, 154, and/or 156 is energized to facilitate maintaining helical flowpath 162 of cooling air 160 about gas turbine engine 10. Moreover, increasing the velocity of cooling air 160 facilitates increasing the cooling capacity of cooling air 160, thus reducing the operating temperature of gas turbine engine 10. Cooling air 160 is then discharged through cooling system exhaust duct 106.

The above-described gas turbine engine module assembly is cost-effective and highly reliable. The engine module assembly includes a cooling system that facilitates generating a substantially helical air flowpath circumferentially around the gas turbine engine. More specifically, a pair of deflectors impart a swirling motion to the cooling air such that the cooling air revolves at least once about a circumference of the gas turbine engine. At least one booster fan is used to facilitate increasing the velocity of the cooling air and maintaining the helical flowpath axially around the outer periphery of the gas turbine engine. Accordingly, the gas turbine engine is circumferentially exposed to cooling air at approximately the same velocity and temperature. The cooling system described herein facilitates maintaining a uniform thermal environment around and along the gas turbine engine, thus out-of-round distortion and backbone bending of the gas turbine engine which are caused by thermal gradients are facilitated to be reduced. Accordingly, thermal gradients are reduced and clearances within the gas turbine engine are maintained.

Exemplary embodiments of gas turbine assemblies are described above in detail. The assemblies are not limited to the specific embodiments described herein, but rather, components of each assembly may be utilized independently and separately from other components described herein. Specifically, the cooling system described herein can also be used in combination with other gas turbine engine assemblies.

While the invention has been described in terms of various specific embodiments, those skilled in the art will recognize that the invention can be practiced with modification within the spirit and scope of the claims.

What is claimed is:

1. A method for assembling a gas turbine engine assembly, said method comprising:

mounting a gas turbine engine including an inlet and an exhaust within a module that includes an inlet area, an exhaust area, and an engine area extending therebetween, such that the gas turbine engine is housed within the module;

coupling a first deflector within the module engine area and spaced from the gas turbine engine such that when cooling air is channeled past the deflector, the first deflector induces a substantially helically-shaped cooling air flowpath around a periphery of the gas turbine engine, said first deflector is formed with a curved contour that is substantially similar to an external curved contour of the gas turbine engine; and coupling an exhaust duct to an outlet of the module exhaust area.

2. A method in accordance with claim 1 further comprising coupling a second deflector within the module such that at least a portion of the cooling air flowing past the first deflector is channeled between the first and second deflectors.

3. A method in accordance with claim 1 further comprising coupling a first booster fan assembly within the module to facilitate increasing a velocity of the helically-shaped cooling air flowpath.

4. A method in accordance with claim 1 further comprising coupling a first booster fan assembly within the module such that the helically-shaped cooling air flowpath is channeled a plurality of times around the gas turbine engine.

5. A method in accordance with claim 4 further comprising coupling a second booster fan assembly in flow communication with the first booster fan assembly, wherein the first booster fan assembly is configured to discharge the helically-shaped cooling air flowpath at a first velocity and the second booster fan assembly is configured to discharge the helically-shaped cooling air flowpath at a second velocity that is greater than the first velocity.

6. A cooling system for a gas turbine engine assembly including a module and a gas turbine engine housed within said module, said cooling system comprising:
a first deflector coupled within said module and spaced from the gas turbine engine, said first deflector is formed with a curved contour that is substantially similar to an external curved contour of the gas turbine engine; and
a first supply fan configured to channel cooling air through said first deflector such that a substantially helically-shaped cooling air flowpath is generated around said gas turbine engine.

7. A cooling system in accordance with claim 6 further comprising a second deflector coupled within said module such that at least a portion of the helically-shaped cooling air flowpath is channeled between said first and second deflectors.

8. A cooling system in accordance with claim 7 wherein at least a portion of said first deflector is coupled adjacent to at least a portion of said second deflector.

9. A cooling system in accordance with claim 7 further comprising a second supply fan configured to channel cooling air through said first deflector.

10. A cooling system in accordance with claim 7 further comprising a first booster fan assembly configured to increase a velocity of the helically-shaped cooling air flowpath.

11. A cooling system in accordance with claim 10 wherein said first booster fan assembly is configured to generate the helically-shaped cooling air flowpath having a velocity sufficient to enable the flowpath to extend around the gas turbine engine a plurality of times.

12. A cooling system in accordance with claim 10 further comprising a second booster fan assembly in flow communication with said first booster fan assembly, said first booster fan assembly is configured to discharge the helically-shaped cooling air flowpath at a first velocity, said second booster fan assembly configured to discharge the helically-shaped cooling air flowpath at a second velocity that is greater than the first velocity.

13. A cooling system in accordance with claim 12 wherein said first and second booster fan assemblies are coupled within said module at an angle that has a tangential component relative to a centerline axis of said gas turbine engine.

14. A gas turbine engine assembly comprising:
a module;
a gas turbine engine housed within said module; and
a cooling system for cooling said gas turbine engine comprising:
a first deflector coupled within said module and spaced from the gas turbine engine, said first deflector is formed with a curved contour that is substantially similar to an external curved contour of the gas turbine engine; and
a first supply fan configured to channel cooling air through said first deflector such that a substantially helically-shaped cooling air flowpath is generated around said gas turbine engine.

15. A gas turbine engine assembly in accordance with claim 14 further comprising a second deflector coupled adjacent said first deflector such that at least a portion of the helically-shaped cooling air flowpath is channeled between said first and second deflectors.

16. A gas turbine engine assembly in accordance with claim 14 further comprising a second supply fan configured to channel cooling air through said first deflector such that a substantially helically-shaped cooling air flowpath is generated around said gas turbine engine.

17. A gas turbine engine assembly in accordance with claim 14 further comprising a first booster fan assembly configured to increase a velocity of the helically-shaped cooling air flowpath.

18. A gas turbine engine assembly in accordance with claim 17 wherein said first booster fan assembly is configured generate a helically-shaped cooling air flowpath having a velocity sufficient to enable the flowpath to extend around said gas turbine engine a plurality of times.

19. A gas turbine engine assembly in accordance with claim 17 further comprising a second booster fan assembly in flow communication with said first booster fan assembly, said first booster fan assembly configured to discharge the helically-shaped cooling air flowpath at a first velocity, said second booster fan assembly configured to discharge the helically-shaped cooling air flowpath at a second velocity that is greater than the first velocity.

20. A gas turbine engine assembly in accordance with claim 19 wherein said first and second booster fan assemblies are coupled within said module at an angle that has a tangential component relative to a centerline axis of said gas turbine engine.

* * * * *